(12) United States Patent
Kapcar et al.

(10) Patent No.: US 11,954,619 B1
(45) Date of Patent: Apr. 9, 2024

(54) ANALYSIS AND PROCESSING OF SKILLS RELATED DATA FROM A COMMUNICATIONS SESSION WITH IMPROVED LATENCY

(71) Applicant: TrueBlue, Inc., Tacoma, WA (US)

(72) Inventors: Christopher A. Kapcar, Hinsdale, IL (US); Carlos A. Lara Maldonado, Bellevue, WA (US); Robert Michael Ward, Issaquah, WA (US); Jeffrey S Dirks, Kirkland, WA (US)

(73) Assignee: TRUEBLUE, INC., Tacoma, WA (US)

( * ) Notice: Subject to any disclaimer, the term of this patent is extended or adjusted under 35 U.S.C. 154(b) by 20 days.

(21) Appl. No.: 17/574,532

(22) Filed: Jan. 12, 2022

(51) Int. Cl.
*G06Q 10/0631* (2023.01)
*G06N 5/04* (2023.01)

(52) U.S. Cl.
CPC ....... *G06Q 10/063112* (2013.01); *G06N 5/04* (2013.01); *G06Q 10/06312* (2013.01)

(58) Field of Classification Search
None
See application file for complete search history.

(56) References Cited

U.S. PATENT DOCUMENTS

| | | | | |
|---|---|---|---|---|
| 8,694,305 | B1 * | 4/2014 | Grove | G06F 40/40 704/4 |
| 10,162,900 | B1 * | 12/2018 | Chatterjee | G06F 16/334 |
| 11,012,567 | B2 * | 5/2021 | Paiva | H04M 3/5191 |
| 11,144,882 | B1 * | 10/2021 | Olshansky | H04N 7/15 |
| 11,153,655 | B1 * | 10/2021 | Germano | H04N 21/4668 |
| 2009/0216524 | A1 * | 8/2009 | Skubacz | G06F 40/30 704/10 |
| 2013/0212031 | A1 | 8/2013 | Barnfield et al. | |
| 2015/0003603 | A1 * | 1/2015 | Odinak | G10L 17/26 379/265.11 |
| 2015/0269529 | A1 * | 9/2015 | Kyllonen | G06Q 10/1053 705/321 |
| 2016/0162582 | A1 * | 6/2016 | Chatterjee | G06F 16/248 707/706 |
| 2016/0198047 | A1 * | 7/2016 | McCormack | G06Q 30/016 379/265.09 |
| 2017/0249389 | A1 * | 8/2017 | Brovinsky | G06Q 30/02 |

(Continued)

FOREIGN PATENT DOCUMENTS

WO WO-2019195808 A1 * 10/2019 ......... G06K 9/00221

OTHER PUBLICATIONS

Trueblue, archives org, Jan. 3, 2021 https://web.archive.org/web/20210103095703/https://www.trueblue.com/ (Year: 2021).*

(Continued)

*Primary Examiner* — Octavian Rotaru
(74) *Attorney, Agent, or Firm* — Evolve Patent Law Group PLLC; Linda Zachariah (57) ABSTRACT

Apparatuses, systems, and methods described include receiving data related to an availability for a shift, automatically triggering initiation of a communications session related to the shift, conducting the communications session, and receiving and storing a plurality of audio or audio and visual signals from the communications session. Machine learning (ML) sentiment analysis is performed on data of the communications session and based on the sentiment analysis, a reliability score is determined.

20 Claims, 8 Drawing Sheets

(56) References Cited

U.S. PATENT DOCUMENTS

| | | |
|---|---|---|
| 2018/0060307 A1* | 3/2018 | Misra ................... G06N 3/08 |
| 2018/0096283 A1* | 4/2018 | Wang ............ G06Q 10/063112 |
| 2018/0276618 A1 | 9/2018 | Nichani et al. |
| 2019/0066030 A1 | 2/2019 | Hancock et al. |
| 2019/0114593 A1* | 4/2019 | Champaneria ...... G06F 16/3326 |
| 2019/0149501 A1* | 5/2019 | Bastide ................. G06Q 50/01 |
| | | 709/206 |
| 2019/0311331 A1* | 10/2019 | Steinhoff ................ G10L 15/05 |
| 2019/0378017 A1 | 12/2019 | Kung |
| 2020/0082828 A1* | 3/2020 | Malpani ................. G10L 15/26 |
| 2020/0252510 A1* | 8/2020 | Ghuge ................... G10L 15/26 |
| 2020/0258047 A1* | 8/2020 | Randall ................. G06N 3/006 |
| 2020/0302371 A1 | 9/2020 | Mathiesen et al. |
| 2021/0044697 A1* | 2/2021 | Khafizov ............. G06F 18/285 |
| 2021/0056168 A1* | 2/2021 | Bull ..................... G06F 40/211 |
| 2021/0218844 A1* | 7/2021 | Matias ................ G06Q 10/107 |
| 2021/0286945 A1* | 9/2021 | Nagar ................... G06N 20/00 |
| 2021/0312399 A1 | 10/2021 | Asokan et al. |
| 2021/0392227 A1* | 12/2021 | Li ........................ H04M 3/2218 |
| 2022/0027837 A1* | 1/2022 | D'Attilio ............ H04M 3/5175 |
| 2022/0180266 A1* | 6/2022 | Guiffre ............ G06Q 10/06311 |

OTHER PUBLICATIONS

Non-Final Office Action dated Mar. 14, 2023 for U.S. Appl. No. 17/574,543, filed Jan. 12, 2022, 31 pages.

Final Office Action dated Oct. 4, 2023 for U.S. Appl. No. 17/574,543, filed Jan. 12, 2022, 37 pages.

Remipeople, How to Boost Visibility of Job Posts on Linkedin, Sep. 24, 2021, https://web.archive.org/web/2021092402022/http://remipeople.com/how-to-boost-visibility-of-job-posts-on-linkedin-free-guaranteed-exposed/ , p. 2-3.

Non-Final Office Action dated Jan. 18, 2024 for U.S. Appl. No. 17/574,543, filed Jan. 12, 2022, 37 pages.

* cited by examiner

Sentiment Analysis
E.g., confidence Score

| Confidence Score | Assigned Weight |
|---|---|
| Range 8-10 | .9 |
| Range 6-8 | .8 |
| Range 4-6 | .6 |
| Range 2-4 | .2 |
| Range -1-3 | .1 |
| Range 0 | 0 |

FIG.8

ANALYSIS AND PROCESSING OF SKILLS RELATED DATA FROM A COMMUNICATIONS SESSION WITH IMPROVED LATENCY

TECHNICAL FIELD

This disclosure relates generally to telephonic and video communications, and in particular to artificial intelligence (AI) analysis of audio and/or video data.

BACKGROUND INFORMATION

Artificial Intelligence (AI) is a broad field which uses hardware and software to emulate human intelligence. Machine learning (ML) is a subset of AI and focuses on solving problems by utilizing computers that learn from data without explicit programming. Deep learning is a subset of ML and uses artificial neural networks (ANNs) having many layers, e.g., deep neural networks (DNNs), that learn from large amounts of data. DNNs are a valuable tool for natural language processing (NLP) which involves the processing of text or voice data to understand a person's full meaning or intent in spoken or written language. NLP can be complex, requiring heavy computational loads, and may include tasks related to speech recognition, word disambiguation, natural language understanding and natural language generation. Sentiment analysis, which may reveal a person's true opinions or emotions, is another example of a task included in NLP.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of systems and methods for automatically validating skills are described herein. Embodiments include connecting with a user (e.g., worker for a shift) via telephone or video, analyzing an artificial intelligence (AI) conversation conducted by an AI agent and determining a skills reliability score.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

AI is under-utilized in the staffing industry. Efficient deployment of large numbers of workers to jobs (e.g., 70,000-100,000 per day), especially temporary or gig workers, requires radically improved assessment and/or validation of each worker's skill level for a particular task or job. Millions of jobs go unfilled each year as employers seek to find workers with skills that match or could be trained to match in-demand jobs.

Accordingly, embodiments include systems and methods for automatically validating skills of a worker utilizing ML analysis of telephonic and/or video data. In embodiments, a communications interface receives data related to availability for a shift from a network. If the data is positive, a controller is coupled to trigger automatic initiation of the communications session to an available worker based on the data. In embodiments, the communications session includes a conversation between an AI agent and the worker related to the shift. In embodiments, machine learning (ML) is used to perform sentiment analysis of the communication between the AI agent and the worker to determine a skills reliability score for the shift. In embodiments, the skills reliability score includes a measurement or gauge of aptitude for a shift as well as interest in the shift such that the worker attends the shift and is able to perform the skills necessary for an accepted shift.

These and other embodiments are described in detail below with respect to FIGS. 1-8.

Figure 1:
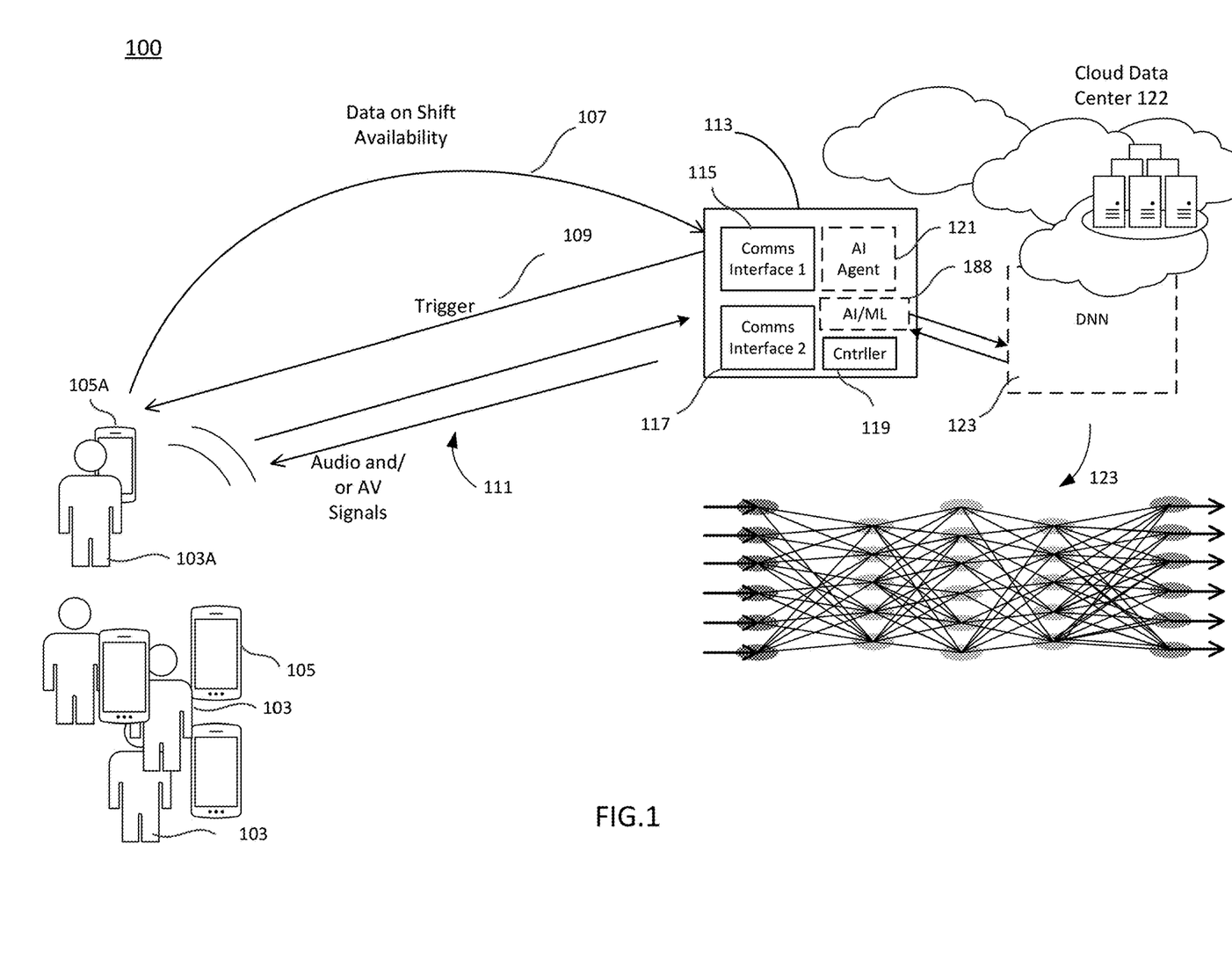
FIG. 1 illustrates an example environment that includes a system for automatically validating skills with the assistance of an AI agent, in accordance with embodiments of the disclosure.

FIG. 1 illustrates an example environment 100 including a system for automated skills validation for a worker, in accordance with embodiments of the disclosure. The illustrated environment 100 includes a computing device 113 communicatively coupled to a device 105A, e.g., mobile device, of a worker 103A and an ML engine 188. Note that although device 105A is shown as a smartphone in FIGS. 1 & 2, other suitable computing devices (e.g., laptop, desktop, watch, PDA-type device, etc.) utilized by worker 103A and having similar computing and communications capabilities are contemplated. In embodiments, computing device 113 includes a first communications interface 115, a second communications interface 117, an artificial intelligence (AI) agent 121, and controller 119. In embodiments, first communications interface is to receive data 107 related to availability for a shift related to worker 103A from a network. In embodiments, second communications interface 117 receives from the network, audio signals from a communications session related to skills for the shift. In some aspects, if data 107 indicates that worker 103A is potentially available for a shift (for example, but not limited to, worker 103A has just finished a shift or will be finished with one or more shifts or as part of an onboarding process), initiation of a communications session 111 is triggered by circuitry and software of controller 119. In embodiments, communications session 111 is at least one of a phone call or a video call and includes a conversation (as will be shown and described with respect to FIG. 3) between AI agent 121 and worker 103A related to skills related to the shift In embodiments, the conversation is stored in a storage medium coupled to computing device 113. In embodiments, computing device 113 includes ML engine 188 that performs sentiment analysis utilizing a deep neural network (DNN) 123 on the data from the audio signals of the communication session 111 between AI agent 121 and worker 103A to determine a reliability score, e.g., skills reliability score, for matching worker 103A with the shift. In embodiments, the skills reliability score indicates the worker's suitability for the shift and is described in further detail with respect to, at least, FIGS. 4-6.

In some embodiments, an AI/ML compute engine, e.g., ML engine 188 is included in computing device 113. In some embodiments, computing device 113 is located at a staffing agency premises. In other embodiments, computing device 113 is located at or partially at a cloud datacenter 122 and includes one or more devices or processors (see, e.g., FIG. 7). In embodiments, ML engine 188 is coupled with another ML engine and includes a deep neural network, e.g., DNN 123, located in cloud data center 122. In some embodiments, inference for sentiment analysis is performed at a computing device 113 and training is performed at a further remote DNN 123. In other embodiments, both inference and training are performed at DNN 123 one or the other of computing device 113 and DNN 123.

In embodiments, ML engine 188 includes or is coupled with processing resources to perform natural language processing, e.g., involving speech recognition, natural language understanding, sentiment analysis, and natural language generation. In embodiments, AI agent 211 may receive instruction and provide feedback from/to ML engine 188. In some embodiments, AI Agent is provided via cloud data center 122 through an AI or bot service coupled to receive information from ML engine 188.

Figure 2:
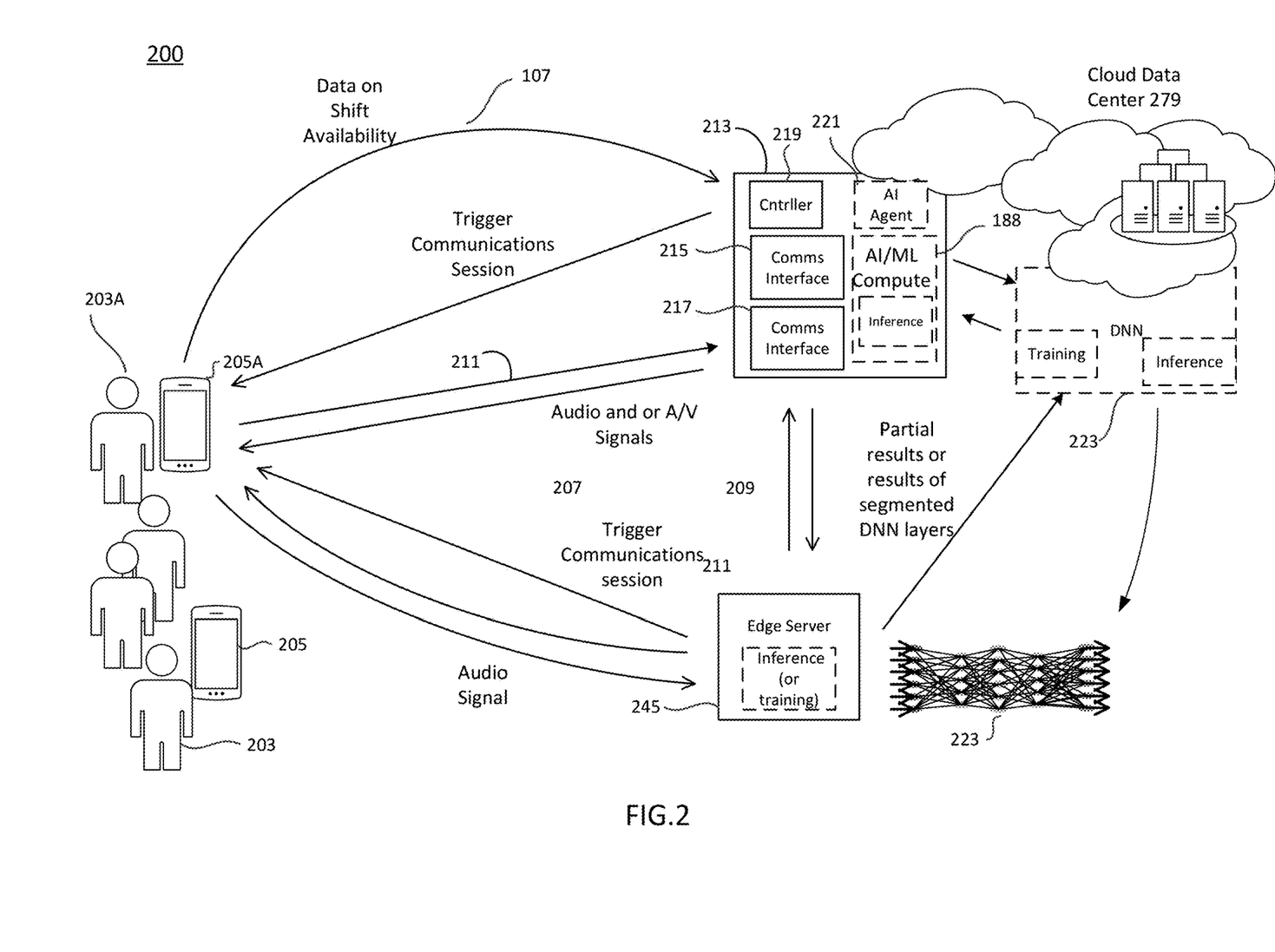
FIG. 2 illustrates another example environment that includes a system for automatically validating skills with the assistance of an AI agent, in accordance with embodiments of the disclosure.

Referring now to FIG. 2 which illustrates another example environment 200 that may include a system for automated skills validation, in accordance an embodiment of the disclosure. Note that the illustrated environment 200 includes similar elements to FIG. 1 and certain like elements may not be re-introduced. In the embodiment of FIG. 2, dependent on a location of the worker relative to ML engine 188, controller 219 triggers the communications session to be initiated from a first location or a second location.

In some aspects, if the data 107 indicates that worker 203A is available for a shift, initiation of a communications session 211 is triggered by controller 219. In embodiments, communications session 211 is at least one of a phone call or a video call and includes a conversation between AI agent 221 and worker 203A related to skills for the shift. In the illustrated embodiment, if a location of worker 203A is closer in proximity to an edge server 245 than he or she is to a computing device 213 (or cloud data center 222), controller 219 may trigger communications session 111 to be initiated and conducted from edge server 245, rather than computing device 213 or cloud data center 279. In embodiments, edge server 245 assists with the inference that is required to determine whether worker 203A is to be offered the shift.

Figure 4A:
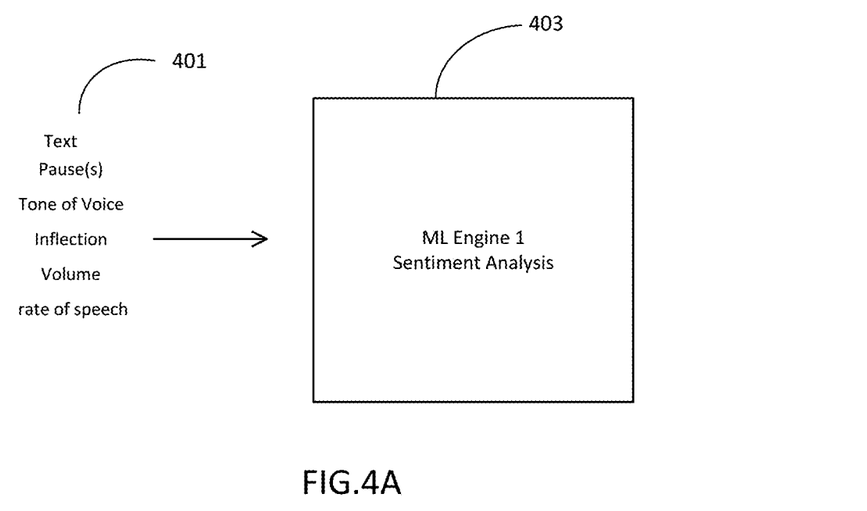
FIG. 4A is a block diagram illustrating respective example inputs associated with a communications session, in accordance with embodiments of the disclosure.

In embodiments, edge server 245 performs processing on a DNN 223 to perform NLP including sentiment analysis of the worker's answers to assist in determining a next question or action by AI agent 221 (discussed in more detail with respect to FIG. 4) and/or if worker 203A should be offered a particular shift. In embodiments, a proximity of edge server 245 reduces latency by reducing the amount of data to be transferred and processed long distances, e.g., a high amount of data associated with images and data from a video communications session.

Figure 5:
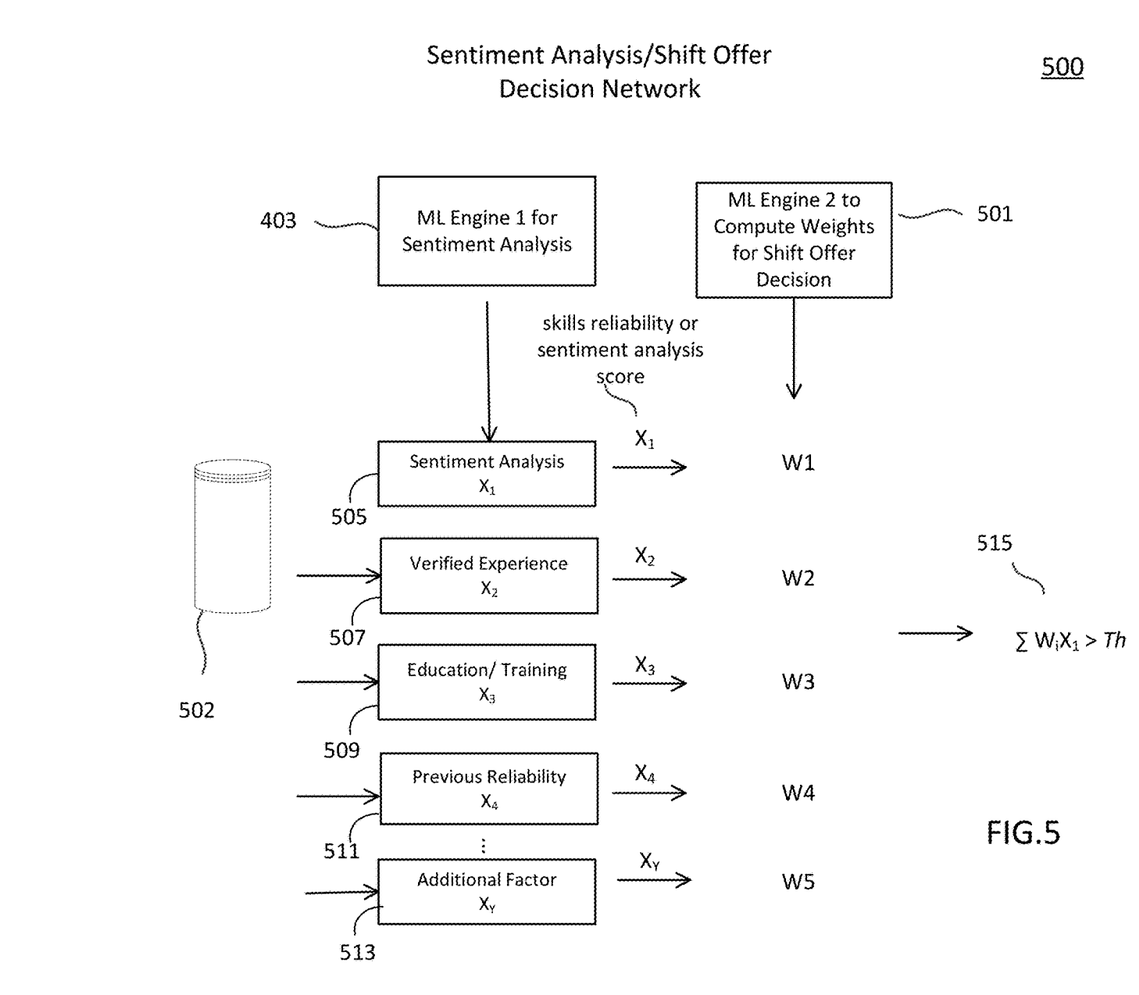
FIG. 5 which is a block diagram illustrating a shift offer decision network in accordance with embodiments of the disclosure.

In some embodiments, full or partial results of sentiment analysis of the communications session can be provided to computing device 213 or cloud data center 279 for remaining processing (e.g., see FIG. 5, sentiment analysis/shift offer decision network and/or associated analytics). In some embodiments, DNN 223 includes segmented DNN layers to perform portions of inference (or training) on the communications session. In some embodiments, remaining segments of DNN layers may be processed by computing device 213 or cloud data center 279. In embodiments, as noted above, receiving and performing portions of the inference at edge server 245 improves latency due to transmission and processing of data associated with communications session 211. Note that in some embodiments inference (or rarely but possibly supervised or unsupervised training) may be performed in at least three locations, computing device 213, cloud data center 279, edge server 245 or in some embodiments, mobile device 205A.

Note that DNN 123 or 223 is only a simplified depiction of a portion of an example DNN model. In various embodiments, DNN models contemplated may include any suitable fully connected or sparsely connected network, including feed-forward networks, recurrent neural networks, convolutional neural networks, and other variations which are suitable for performing NLP of the worker's responses during the communications session.

Figure 3:
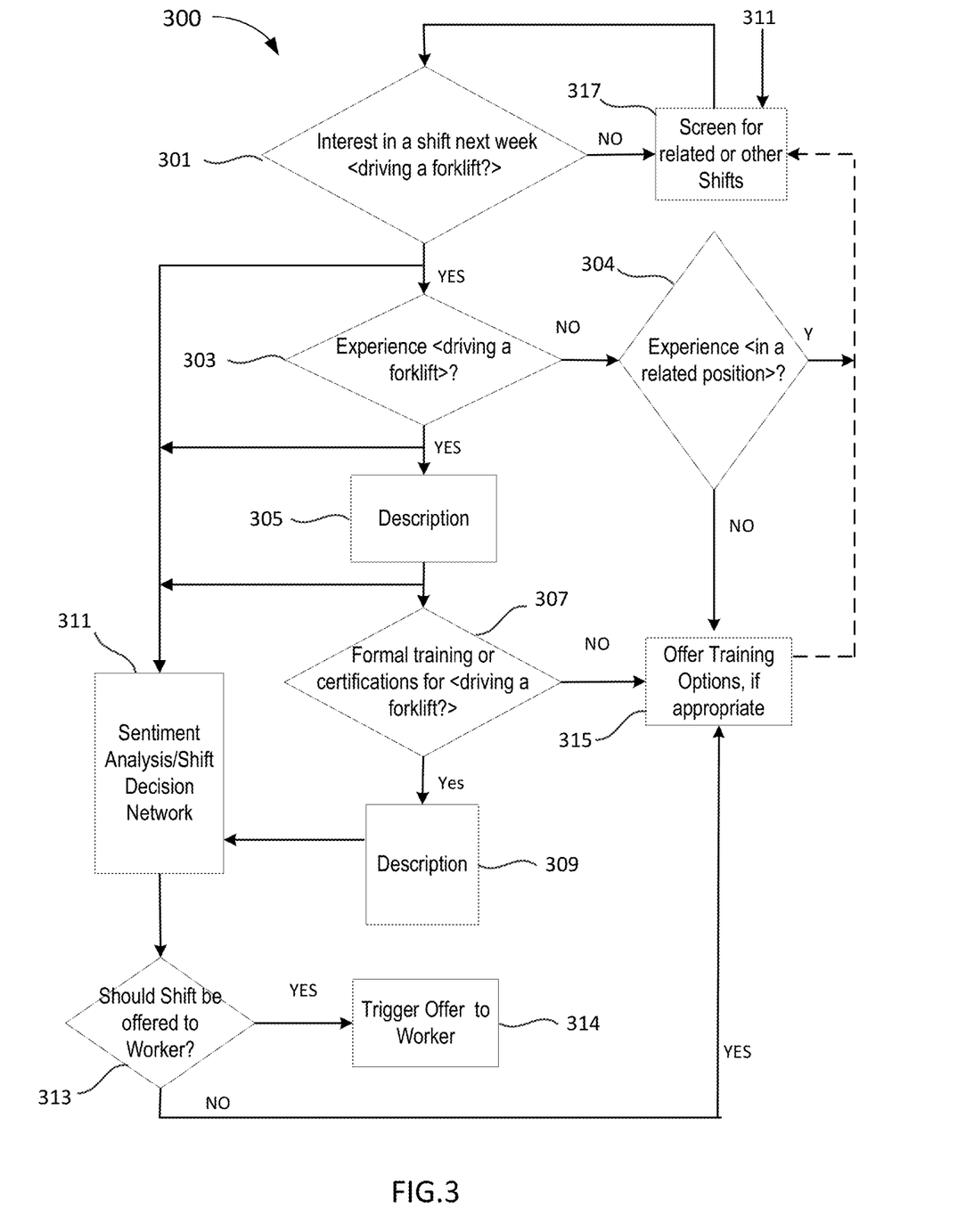
FIG. 3 is a flow diagram of an example method associated with a communications session conducted by an AI agent, according to embodiments of the disclosure.

FIG. 3 is a flow diagram of an example method 300 associated with a communications session, e.g., communications sessions 111 or 211 of FIGS. 1 and 2, conducted by the AI agent, according to embodiments. In embodiments, method 300 or portions of method 300 may be performed by, e.g., computing devices 113, 213, or 245 of FIGS. 1 and 2.

For example, method 300 may begin at block 301 where a particular shift for a particular date and/or time in the future is proposed to a worker. In the example of FIG. 3, the shift may include a shift for operating or driving a forklift. In some aspects, if the worker answers YES, the flow moves to next block 303, where the worker is asked if he or she has specific experience driving a forklift. In the embodiment, the answer is again YES, method 300 moves to block 305 where the worker is asked to describe the experience, e.g., type and length of experience.

In the alternative, if the answer received from the worker is NO at block 303, and experience is required for the particular shift, alternative placement may be considered. In some embodiments, the method flows from block 303 to the right to block 304 where the AI agent asks the worker if s/he has experience in a related position, such as, e.g., manually unloading stock or products. If the answer is yes, the method moves upward to block 317 where the worker is further screened for the related shift or other shifts. If the worker is matched to the related shift, method 300 loops back to block 301 to gauge the worker's experience, aptitude, and enthusiasm for the related potential shift.

Returning to block 305, after the worker has indicated s/he has experience, the worker is asked to describe his or her experience. After the worker describes his or her experience, the method may then flow to block 307. In embodiments, at block 307, the worker may be queried as to whether he/she has any formal training, such as certifications or other education for operating a forklift. If the answer is YES at a block 309, the worker is asked follow-up questions. Note that block 309 may represent an exchange between the worker and the AI agent where the AI agent may ask a variety of follow-up questions depending on the answers given by the worker.

In embodiments, each answer provided by the worker at each of above blocks 301-309 including block 304 are provided to an ML engine, e.g., ML engine 403 of FIG. 4A which may be a part of sentiment analysis/shift decision network 500 discussed with respect to FIG. 5. In embodiments, the results of the sentiment analysis and or shift decision output are stored in a relational or a graph database, e.g., shown and discussed with respect to FIG. 6.

In embodiments, shift decision network 500 performs ML on the communication session (e.g., inputs 401 of FIG. 4A) to determine whether the worker should be offered the shift. If sentiment analysis/shift decision network 500 determines that the worker is to be offered the shift at block 313, the answer is YES, and an offer to the worker is triggered at block 314. In some embodiments, computing device 113 (or 213 or 245) may offer details via mobile device or other channel regarding the shift to the worker to confirm whether the worker will accept the offer.

In the alternative, if sentiment analysis/shift decision network 500 determines that the worker will not be offered the shift at block 313, the answer is NO and alternate options may be explored. The alternate options may depend on the reasons why the worker was not offered the shift. In some embodiments, method 300 flows to the right and at a block 315, training options may be offered to the worker, if appropriate. The options may include classes, courses, on-the job training, or otherwise which would enable the worker to qualify for the shift at a later time.

In the alternative or in addition, method 300 flows upwards to a block 317, where in embodiments, the worker may be screened for other shifts that are related or unrelated to the original shift that he or she was considered. Note that in embodiments, inputs to block 317 may be also provided from sentiment analysis/shift decision network of block 311 in order to determine shifts the worker may be considered for. Method 300 may then return to beginning block 301 where the worker may be asked similar questions to gauge a skills reliability score on the new or additional shift.

It is understood that operation of a forklift is merely an example of a proposed job associated with a shift and that in various embodiments, any suitable job that can be matched with a temporary or staff worker is contemplated. Similarly, the content and the order of the questions asked of the worker is only illustrative. In embodiments, any suitable type and order of questions that gauge a worker's qualifications, aptitude, interest, or other relevant factors for being assigned a shift are contemplated. In embodiments, actual outcomes which are fed back into the ML engine (e.g., see FIGS. 4A and 4B and accompanying description) related to offering the shift to the worker may iteratively change the content, order, and timing of an initial or previous flow associated with process 300.

It is understood that the order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

Figure 4B:
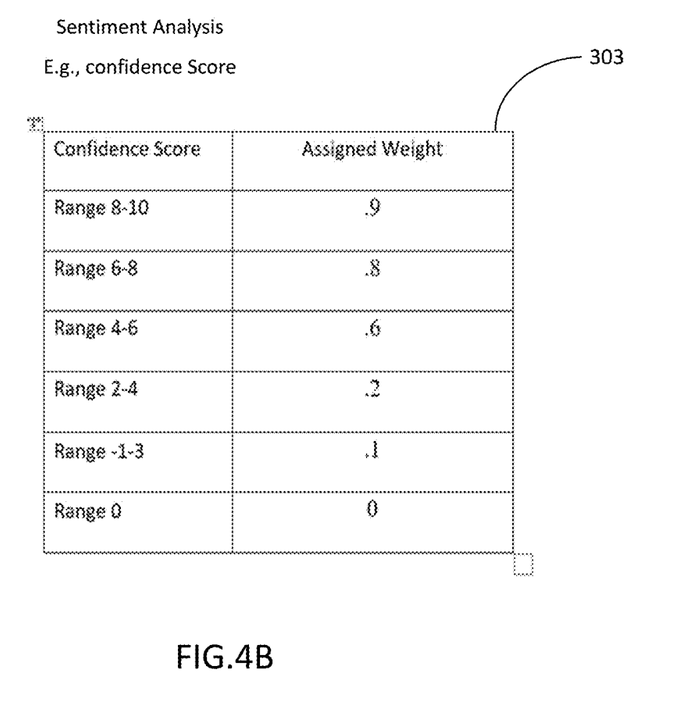
FIG. 4B is a table illustrating respective example sentiment analysis inputs and weights associated with a communications session, in accordance with embodiments of the disclosure.

FIG. 4A is a block diagram illustrating example inputs from a communications session (e.g., FIG. 3) to an ML engine for sentiment analysis. FIG. 4B is a table including weights associated with a confidence score, according to embodiments. In embodiments, ML engine 401 receives various inputs that are extracted from, e.g., communications session 111 or 211 of FIGS. 1 and 2. For example, the inputs extracted from an audio communications session (phone call) may include text and the manner in which the worker delivers the text. The manner in which the worker delivers the text includes for example, but is not limited to, tone of voice, inflection, volume, and rate of speech. In some examples, if the communications session incudes a video session, the manner of delivery may include all of the preceding but may further include the further combinations of facial expressions, body language such as posture, etc.

For example, a worker that answers YES to the question of whether s/he has experience, without pause (rate of speech), in a firm voice (related to tone), may indicate that the worker has high confidence in his or her skills in the particular area, which may be a factor to be considered or weighted in calculating a skills reliability score. In some embodiments, the tone of voice of the worker may also indicate enthusiasm, interest, or distraction which may impact whether the worker will show up for the shift if it is assigned to him/her.

In embodiments, ML engine 403 may determine a confidence score range (as shown in column 1 of table 303 of FIG. 4B) from the various inputs extracted from the communications session. In some embodiments, the confidence score range may be associated/assigned to certain attributes (e.g., actual experience or skill for the shift or likelihood s/he will show up for the shift) and may be assigned a weight that is used at least in part to calculate the skills reliability score. In some embodiments, the assigned weight is a combined weight for all considered attributes. In other embodiments, each attribute may have its own assigned weight. In some embodiments, the skills reliability score is the weight and is used by itself or in combination with other factors by the shift offer decision network of FIG. 5 and the graph database of FIG. 6 to determine if the worker is to be offered the shift.

Note that in embodiments, actual outcomes related to offering the shift to the worker are used in training ML engine 403 to further refine the weights and the predictive ability of the ML engine as to the worker's skill and probability that s/he will show up for the shift. It is understood that the above example is a simplified example of a calculation and weighting assignment scheme and that weights, ranges, attributes and inputs as well as biases that are suitable for determining a skills reliability score for a worker based on the communications session are contemplated.

Furthermore, note that various known methods may be used to avoid unconscious bias in the models. In embodiments, training data sets are large enough and representative enough to sufficiently offset ML bias. In embodiments, results should be tested and validated using various tools to examine and inspect models to confirm that unconscious bias is not reflected or perpetuated via the algorithms or selected data sets.

Referring now to FIG. 5 which is a block diagram illustrating a shift offer decision network 500 in accordance with embodiments of the disclosure. FIG. 5 includes a first ML engine and a second ML engine, e.g., ML Engine 403 and ML Engine 501. In embodiments, ML engine 403 is the same or similar to ML engine 403 of FIG. 4 and provides a skills reliability score for Sentiment Analysis factor 505. In embodiments, a plurality of factors is used in determining whether a worker is ultimately offered a shift. The plurality of factors may include but are not limited to, e.g., verified experience 507, education or training 509, reliability 511 (e.g., based upon a number of previous shows), and additional factors 513. In embodiments, ML Engine 501 ("ML Engine 2") computes weights that each of the different factors should play in determining whether a worker is to be offered a shift. For example, for a shift requiring little to no experience, e.g., stocking shelves, "verified experience" may hold a lower weight relative to a shift involving a higher skill set, e.g., operating heavy equipment. ML Engine 2 may be trained according to the outcomes of various job assignments including values for factors 505-513 associated with the worker assigned the shift.

In some embodiments, a skills reliability score related to sentiment analysis is combined and summed with the weighted values of factors 507-513. In some embodiments, if the result of equation 515 exceeds a pre-determined threshold, the worker may be offered the shift. If the result is lower than the threshold, the worker may not be offered the shift (e.g., at block 313 of FIG. 3).

Note that in some embodiments, values related to factors 505-513 may be stored in a database 502. In some embodiments, factors 505-513 and their weights may be stored in a relational database or a graph database, as discussed below.

Figure 6:
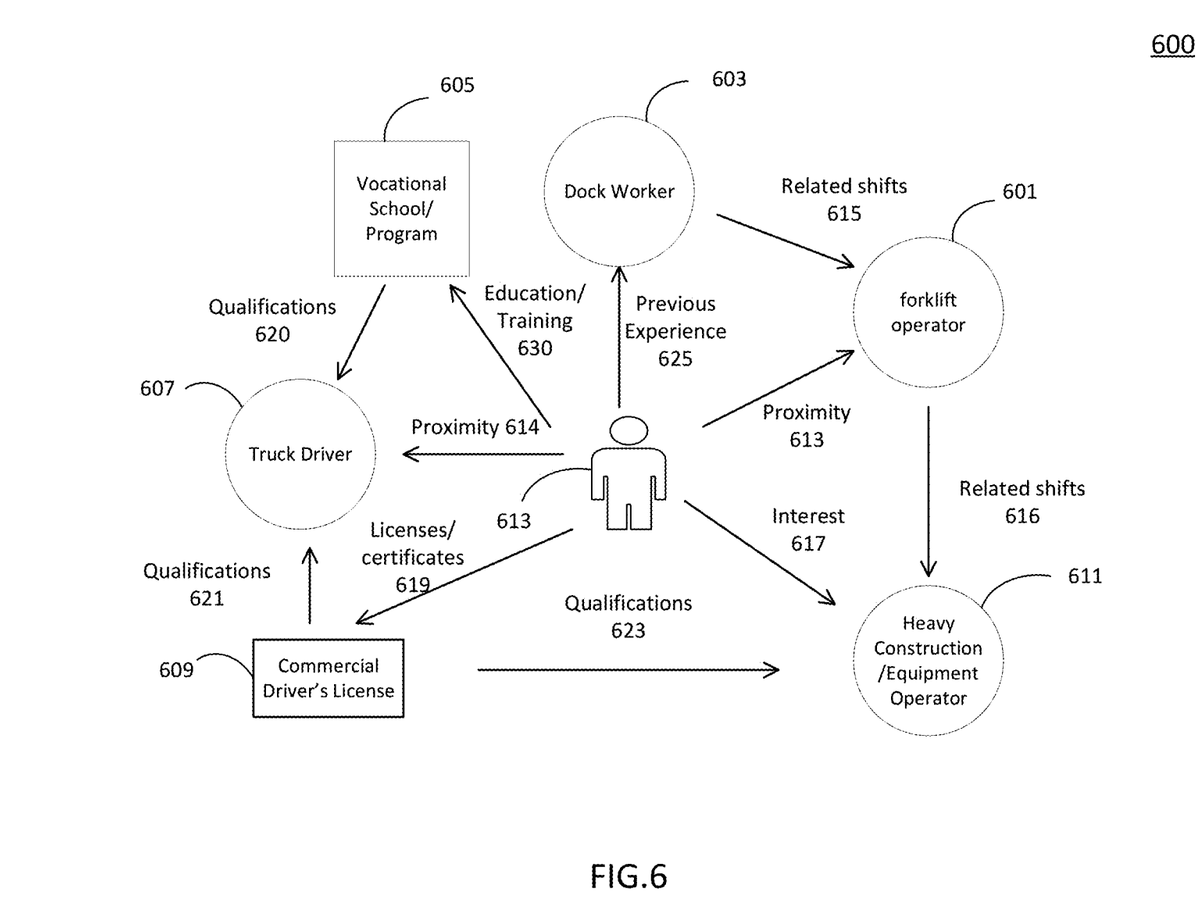
FIG. 6 illustrates an example graph database, in accordance with embodiments of the disclosure.

FIG. 6 illustrates an example graph database, in accordance with embodiments of the disclosure. In embodiments, the skills reliability score along with the other factors and their weights may be stored in a graph database 600. As can be seen, graph database 600 includes nodes storing and representing workers (e.g., worker 613) and possible roles at particular shifts (e.g., forklift operator 601, dock worker 603, truck driver 607, and heavy/construction equipment operator 611). Other nodes include, e.g., qualifications, commercial driver license 609, training/certifications/degrees at vocational schools/programs 605. In embodiments, note that each of the nodes may hold a plurality of properties or attributes or be tagged with e.g., labels including metadata representing details or information particular to the node. For example, dock worker 603 may include one or more shifts as a dock worker or may be a particular shift including time, date, location, employer, and requirements for the shift in general and/or in particular to the employer.

In the example shown, edges which represent the relationships between nodes may include, e.g., proximity 613 614, related shifts 615 616, interest 617, requirements for licenses/certificates 619, qualifications required by a shift 620 621 623 education/training 630 627, and previous experience 625. In embodiments, the edges may have a plurality of properties, such as but not limited to, weights which may be determined at least in part by sentiment analysis. For example, if the worker expresses a low confidence score for interest for a heavy construction/equipment operator during the communications session, e.g., a relatively lower weight may be applied to interest edge 617. Or in contrast, if s/he expresses confidence in his or her previous experience, a relatively higher weight may be applied to the previous experience. In other embodiments, the sentiment analysis results can be applied to the shift analysis decision network as a separate variable.

In embodiments, graph database 600 is a storage system that includes nodes and edges to store and represent data. Graph database 600 may be stored in a storage medium, e.g., database 502 of FIG. 5, coupled to computing device 113 or 213 in order to run queries. Note that graph database 600 is a simplified portion of a graph database including example nodes and edges. In embodiments, any suitable nodes or edges (or configurations) that represent data and relationships that may be relevant to determining an appropriate shift for a worker may be contemplated. Note that graph database 600 may be a small portion of a large unstructured dataset. In some embodiments, the data represented may be stored in a relational database (e.g., where the nodes as shown in graph database 600 are tables).

Figure 7:
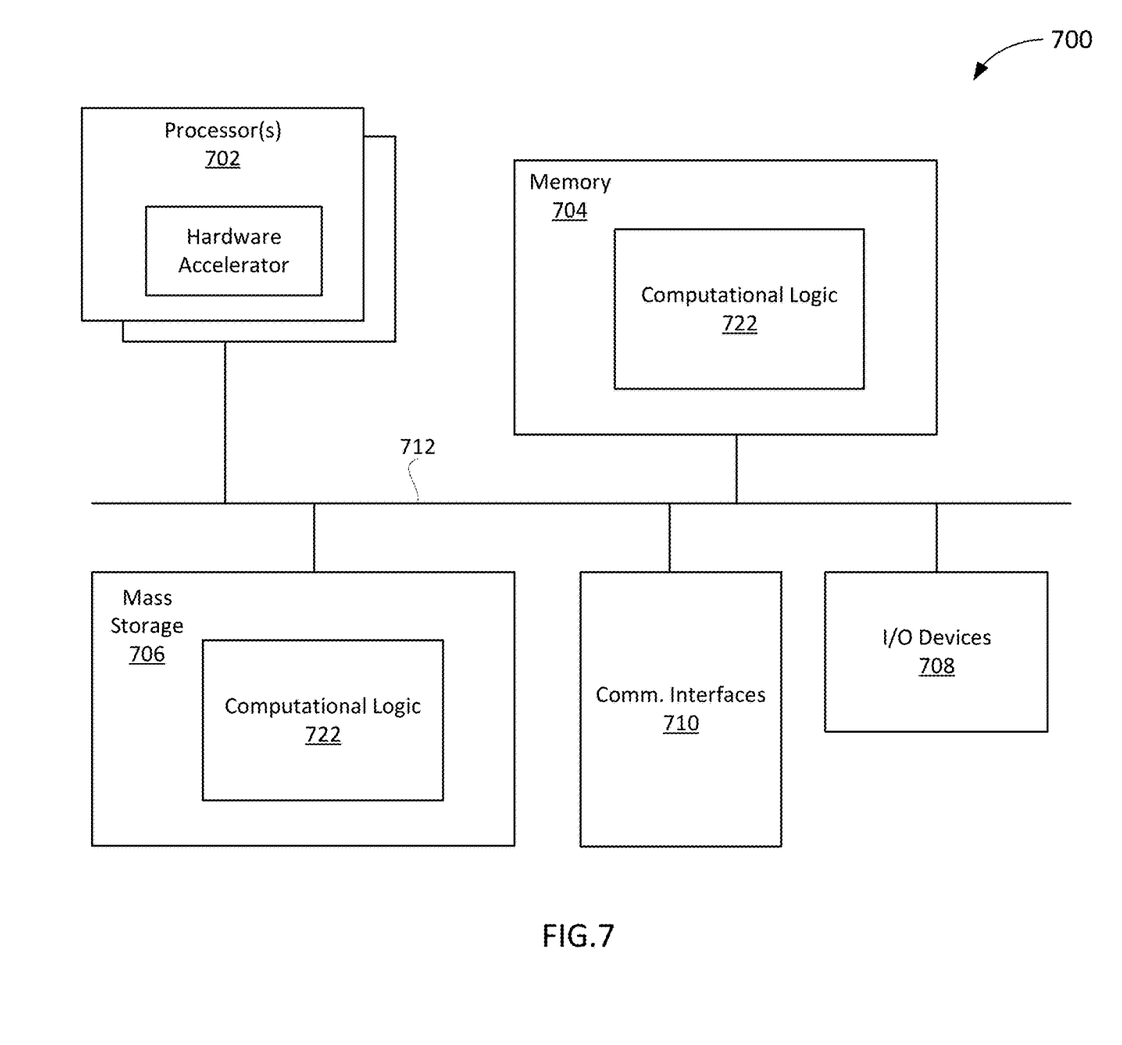
FIG. 7 is an example computing device, in accordance with embodiments of the disclosure.

FIG. 7 illustrates an example computing device 700 suitable for use with embodiments, such as described in connection with FIGS. 1-6 (e.g., computing device 113, 213, 245, devices 105A, 205A, or servers in cloud datacenter 122, 279). As shown, computing device 700 may include one or more processors or processor cores 702 and memory 704. In embodiments, memory 704 may be system memory. For the purpose of this application, including the claims, the terms "processor" and "processor cores" may be considered synonymous, unless the context clearly requires otherwise. The processor 702 may include any type of processors, such as a central processing unit CPU, graphics processing unit (GPU), a microprocessor, specialized AI hardware accelerators, and the like. The processor 702 may be implemented as an integrated circuit having multi-cores, e.g., a multi-core microprocessor. The computing device 700 may include mass storage devices 706 (such as diskette, hard drive, volatile memory (e.g., dynamic random-access memory (DRAM), compact disc read-only memory (CD-ROM), digital versatile disk (DVD), and so forth). In general, memory 704 and/or mass storage devices 706 may be temporal and/or persistent storage of any type, including, but not limited to, as noted above, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth. In embodiments, processor 702 is a high performance or server CPU. In some embodiments, computational logic 722 is configured to cause a sequence of events to occur related to or including connecting with a worker via telephone or video, analyzing an AI conversation with the worker and determining a skills reliability score for matching a worker with a shift.

The computing device 700 may further include input/output (I/O) devices 708 (such as a display (e.g., a touchscreen display), keyboard, cursor control, remote control, gaming controller, image capture device, and so forth) and communication interfaces 710 (such as network interface cards, modems, infrared receivers, radio receivers (e.g., Bluetooth), and so forth). The communication interfaces 710 (and, e.g., communications interfaces 114, 214, 117, and 217 of FIGS. 1 and 2) may include communication chips that may be configured to operate the device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments.

The above-described computing device 700 elements may be coupled to each other via system bus 712, which may represent one or more buses. In the case of multiple buses, they may be bridged by one or more bus bridges (not shown). Each of these elements may perform its conventional functions known in the art. In particular, memory 704 and mass storage devices 706 may be employed to store a working copy and a permanent copy of the programming instructions for the operation of machine learning engines as described above. The various elements may be implemented by assembler instructions supported by processor(s) 702 or high-level languages that may be compiled into such instructions.

The permanent copy of the programming instructions may be placed into mass storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and to program various computing devices.

The number, capability, and/or capacity of the elements 708, 710, 712 may vary, depending on whether computing device 700 is used as a stationary computing device, such as a server computer in a data center, or a mobile computing device, such as a tablet computing device, laptop computer, game console, or smartphone. Their constitutions are otherwise known, and accordingly will not be further described.

In various implementations, the computing device 700 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 701 may be any other electronic device that processes data.

Figure 8:
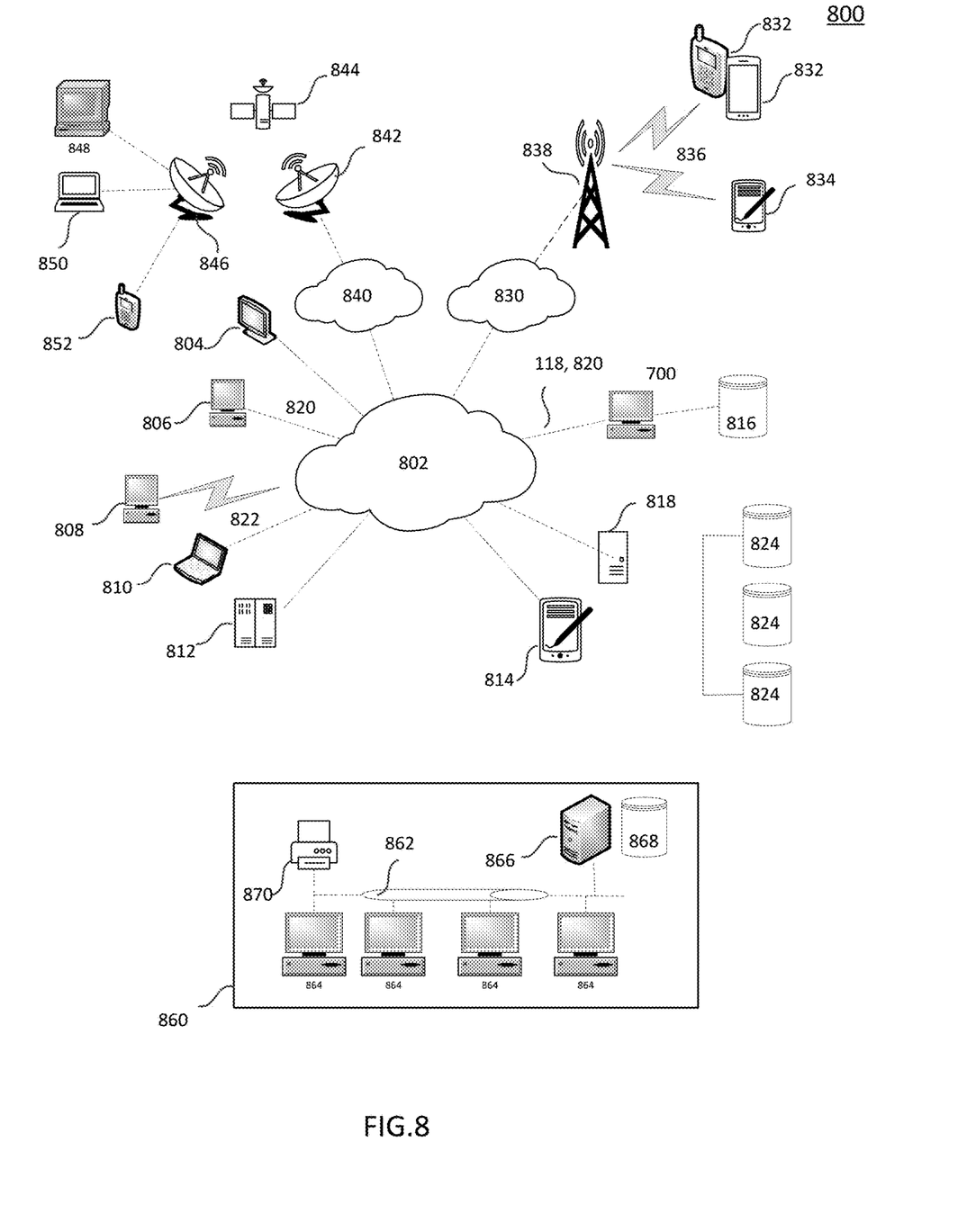
FIG. 8 is an example networked communications system which may include the environments of FIGS. 1 and 2, in accordance with embodiments of the disclosure.

FIG. 8 illustrates a networked communications system 800 that is depicted in FIGS. 1 and 2 and may include one or more computing device(s) 700. Computing device 700 could connect to network 802, for example via the Internet or a wide area network (WAN). Input data 818 and output data 820 could be communicated to other devices via network 802. Other terminals, for example, thin client 804, further processing systems 806 and 808, notebook computer 810, mainframe computer 812, PDA 814, pen-based computer 816, server 818, etc., can be connected to network 802. A large variety of other types of terminals or configurations could be utilized. The transfer of information and/or data over network 802 can be achieved using wired communications means 820 or wireless communications means 822. Server 818 can facilitate the transfer of data between network 802 and one or more databases 824. Server 818 and one or more databases 824 provide an example of an information source.

Other networks may communicate with network 802. For example, telecommunications network 830 could facilitate the transfer of data between network 802 and mobile or cellular telephone 832 or a PDA-type device 834, by utilizing wireless communication means 836 and receiving/transmitting station 838. Mobile telephone 832 devices may load software (client) that communicates with a backend server 806, 812, 818 that operates a backend version of the software. The software client may also execute on other devices 804, 806, 808, and 810. Client users may come in multiple user classes such as worker users and/or employer users.

Satellite communications network 840 could communicate with satellite signal receiver 842 which receives data signals from satellite 844 which in turn is in remote communication with satellite signal transmitter 846. Terminals, for example further processing system 848, notebook computer 850, or satellite telephone 852, can thereby communicate with network 802. A local network 860, which for example may be a private network, LAN, etc., may also be connected to network 802. For example, network 802 may relate to ethernet 862 which connects terminals 864, server 866 which controls the transfer of data to and/or from database 868, and printer 870. Various other types of networks could be utilized.

The processing device 700 is adapted to communicate with other terminals, for example further processing systems 806, 808, by sending and receiving data, 118, 120, to and from the network 802, thereby facilitating possible communication with other components of the networked communications system 800.

Thus, for example, the networks 802, 830, 840 may form part of, or be connected to, the Internet, in which case, the terminals 806, 812, 818, for example, may be web servers, Internet terminals or the like. The networks 802, 830, 840, 860 may be or form part of other communication networks. Communication channels may include or be routed through one or more wired or wireless communication utilizing IEEE 802.11 protocols, Bluetooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a LAN (e.g., 860), a Wide Area Network (WAN), a public network (e.g. "the Internet"), a private network, a satellite network (e.g., as shown in the Figure), or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transitory medium that can be used to store information for access by a computing device.

A computing device may include a desktop computer, a laptop computer, a tablet, a phablet, a smartphone, a feature phone, a server computer, high-performance server computer or otherwise. A server computer may be located remotely in a data center or be stored locally.

What is claimed is:

1. An apparatus, comprising:
   a first communications interface, executed by one or more hardware processors, to receive data related to availability for a shift from a mobile device of a worker in a network;
   a second communications interface, executed by the one or more hardware processors, to receive audio and video signals from a communications session between an artificial intelligence agent and the worker related to skills for the shift from the network and conducted using the mobile device of the worker from any location where the mobile device is connected to the network;
   a controller executed by the one or more hardware processors, and communicatively coupled to the first communications interface and the second communications interface, configured to:
   i. detect that the worker is in closer proximity to an edge server than a cloud data center, and
   ii. based at least in part on the data related to the availability for the shift from the first communications interface and the detected proximity, further trigger to the worker, on the second communications interface, an automatic initiation of the communications session from the edge server rather than the cloud data center to decrease a latency of the communications session by reducing an amount of data associated with images and the video signals from the communications session; and
   processing logic executed at the edge server, to perform an inference on natural language by processing an initial set of deep neural networks segments at the edge server, and to cause remaining deep neural network segments to be processed at the cloud data center to further improve the latency of the communication session while assisting the artificial intelligence agent to determine a next question among a plurality of questions for the worker.

2. The apparatus of claim 1, wherein dependent on a location of the worker, the controller triggers the communications session to be initiated from a first location or a second location, wherein the first location includes a first machine learning engine and the second location includes the edge server and a second machine learning engine.

3. The apparatus of claim 1, wherein the processing logic is executed by the one or more hardware processors to perform, machine learning (ML) sentiment analysis of the audio signals of the communications session between the artificial intelligence agent and the worker to determine a reliability score that indicates an aptitude and interest by the worker for the shift, wherein the machine learning (ML) sentiment analysis includes analysis of tones of the worker in an audio call.

4. The apparatus of claim 3, wherein the machine learning (ML) sentiment analysis includes sentiment analysis of body language of the worker from the video signals in the communications session.

5. The apparatus of claim 3, wherein the data related to the availability for the shift includes data indicating the worker is available for the shift and the reliability score is a skills reliability score indicating a determined suitability of the worker for the shift.

6. The apparatus of claim 3, wherein the plurality of questions include artificial intelligence generated questions regarding work experience related to the shift.

7. The apparatus of claim 3, wherein the processing logic is further executed at the edge server to cause the reliability score to be provided to a shift matching engine to determine whether the worker is to be offered the shift.

8. The apparatus of claim 3, wherein the processing logic is further executed at the edge server to cause an offer to be sent for the shift to the worker if the reliability score exceeds a threshold.

9. The apparatus of claim 3, wherein the processing logic executed at the edge server to perform machine learning (ML) sentiment analysis includes a request that a remote computing device perform the ML sentiment analysis.

10. A computer-implemented method, comprising:
    receiving, from a first communications interface executed by one or more hardware processors, data related to availability for a shift from a mobile device of a worker in a network;
    receiving, from a second communications interface executed by one or more hardware processors, audio and video signals from a communications session between an artificial intelligence agent and the worker related to skills for the shift from the network and conducted using the mobile device of the worker from any location where the mobile device is connected to the network;

detecting, by a controller, executed by one or more hardware processors and communicatively coupled to the first communications interface and the second communications interface, that the worker is in closer proximity to an edge server than a cloud data center;

based at least in part on the data related to the availability for the shift from the first communications interface and the detected proximity, further triggering, by the controller, to the worker, on the second communications interface, an automatic initiation of the communications session from the edge server rather than the cloud data center to decrease a latency of the communications session by reducing an amount of data associated with images and the video signals from the communications session; and performing, by processing logic at the edge server, an inference on natural language by processing an initial set of deep neural networks segments at the edge server, and by processing remaining deep neural network segments at the cloud data center to further improve the latency of the communications session while assisting the artificial intelligence agent to determine a next question among a plurality of questions for the worker.

11. The method of claim 10, further comprising triggering, by the controller, the communications session dependent on a location of the worker, to initiate the communications session from a first location or a second location, wherein the first location includes a first machine learning engine and the second location includes the edge server and a second machine learning engine.

12. The method of claim 10, further comprising performing, by the processing logic, machine learning (ML) sentiment analysis of the audio signals of the communications session between the artificial intelligence agent and the worker to determine a reliability score that indicates an aptitude and interest by the worker for the shift, wherein the machine learning (ML) sentiment analysis includes analysis of tones of the worker in an audio call.

13. The method of claim 12, wherein the machine learning (ML) sentiment analysis includes sentiment analysis of body language of the worker from the video signals in the communications session.

14. The method of claim 12, wherein the data related to the availability for the shift includes data indicating the worker is available for the shift and the reliability score is a skills reliability score indicating a determined suitability of the worker for the shift.

15. The method of claim 12, wherein the plurality of questions include artificial intelligence generated questions regarding work experience related to the shift.

16. The method of claim 12, further comprising providing, by the processing logic, the reliability score to a shift matching engine to determine whether the worker is to be offered the shift.

17. The method of claim 12, further comprising causing, by the processing logic, an offer to be sent for the shift to the worker if the reliability score exceeds a threshold.

18. The method of claim 12, further comprising performing, by the processing logic, the machine learning (ML) sentiment analysis by requesting that a remote computing device perform the ML sentiment analysis.

19. A non-transitory computer storage medium storing computer-useable instructions that, when executed by at least one hardware processor, cause the at least one hardware processor to:

receive from a first communications interface, data related to availability f or a shift from a mobile device of a worker in a network;

receive from a second communications interface, audio and video signals from a communications session between an artificial intelligence agent and the worker related to skills for the shift from the network and conducted using the mobile device of the worker from any location where the mobile device is connected to the network;

execute a controller communicatively coupled to the first communications interface and the second communications interface, to detect that the worker is in closer proximity to an edge server than a cloud data center;

based at least in part on the data related to the availability f or the shift from the first communications interface and the detected proximity, further execute the controller, to trigger to the worker, on the second communications interface, an automatic initiation of the communications session from the edge server rather than the cloud data center to decrease a latency of the communication session by reducing an amount of data associated with images and the video signals from the communications session; and execute processing logic at the edge server, to perform an inference on natural language by processing an initial set of deep neural networks segments at the edge server, and by causing remaining deep neural network segments to be processed at the cloud data center to further improve the latency of the communications session while assisting the artificial intelligence agent to determine a next question among a plurality of questions for the worker.

20. The non-transitory computer storage medium of claim 19, wherein the computer-useable instructions are further executed by the at least one hardware processor, to cause the at least one hardware processor to:

execute the controller, to trigger the communications session dependent on a location of the worker, to initiate the communications session from a first location or a second location, wherein the first location includes a first machine learning engine and the second location includes the edge server and a second machine learning engine.

* * * * *